United States Patent
Teece et al.

(10) Patent No.: US 11,519,444 B2
(45) Date of Patent: Dec. 6, 2022

(54) WIRE-TRAY-ASSEMBLY WITH STUD-MOUNT INSERTS

(71) Applicant: HellermannTyton Corporation, Milwaukee, WI (US)

(72) Inventors: James S. Teece, Cederburg, WI (US); Scott J. Adams, Menomonee Falls, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 17/123,034

(22) Filed: Dec. 15, 2020

(65) Prior Publication Data

US 2021/0102569 A1  Apr. 8, 2021

Related U.S. Application Data

(62) Division of application No. 16/180,732, filed on Nov. 5, 2018, now Pat. No. 10,900,514.

(60) Provisional application No. 62/582,355, filed on Nov. 7, 2017.

(51) Int. Cl.
| | |
|---|---|
| *F16B 21/07* | (2006.01) |
| *H02G 3/32* | (2006.01) |
| *B60R 16/02* | (2006.01) |
| *F16B 21/10* | (2006.01) |
| *H02G 3/04* | (2006.01) |

(52) U.S. Cl.
CPC ........ *F16B 21/075* (2013.01); *B60R 16/0215* (2013.01); *F16B 21/10* (2013.01); *H02G 3/0406* (2013.01); *H02G 3/0437* (2013.01); *H02G 3/32* (2013.01)

(58) Field of Classification Search
CPC .... F16B 21/075; F16B 21/10; B60R 16/0215; H02G 3/0406; H02G 3/0437; H02G 3/32
See application file for complete search history.

(56) References Cited

U.S. PATENT DOCUMENTS

| | | | |
|---|---|---|---|
| 3,632,071 A | 1/1972 | Cameron et al. | |
| 3,678,798 A | 7/1972 | Van Niel et al. | |
| 4,934,889 A | 6/1990 | Kurosaki | |
| 5,112,475 A | 5/1992 | Henry | |

(Continued)

FOREIGN PATENT DOCUMENTS

| | | |
|---|---|---|
| DE | 20319556 | 3/2004 |
| DE | 202015003578 | 5/2016 |

(Continued)

OTHER PUBLICATIONS

"Extended European Search Report", EP Application No. 21156638.5, dated Jun. 21, 2021, 9 pages.

(Continued)

*Primary Examiner* — Eret C McNichols
(74) *Attorney, Agent, or Firm* — Colby Nipper PLLC

(57) ABSTRACT

A stud-mount insert configured to be releasably retained by a mounting-tab of a wire-tray assembly. The stud-mount insert includes a flange and a body configured to rotate about a longitudinal-axis of a mounting-stud. The flange is configured to overlay an aperture defined by the mounting-tab such that the mounting-stud extends through the aperture into the body. The flange is further configured to engage a top-surface of the mounting-tab proximate a perimeter of the aperture.

9 Claims, 10 Drawing Sheets

(56) References Cited

U.S. PATENT DOCUMENTS

| | | | |
|---|---|---|---|
| 5,173,025 A | | 12/1992 | Asami |
| 5,533,237 A | * | 7/1996 | Higgins ............... F16B 21/075 24/297 |
| 5,536,125 A | * | 7/1996 | Gaw, Jr. ............... F16B 5/0241 411/908 |
| 5,760,338 A | | 6/1998 | Suzuki |
| 5,816,762 A | | 10/1998 | Miura et al. |
| 5,871,182 A | | 2/1999 | Johnson et al. |
| D413,508 S | | 9/1999 | Shibao |
| 6,474,616 B2 | * | 11/2002 | Yamada ............... B60N 2/682 296/43 |
| 6,498,296 B2 | | 12/2002 | Benito-Navazo |
| 6,553,615 B1 | | 4/2003 | Hansen et al. |
| 7,082,650 B2 | | 8/2006 | Awakura et al. |
| 7,374,200 B2 | | 5/2008 | Ikeda et al. |
| 7,546,987 B2 | | 6/2009 | Sinkoff |
| 8,579,570 B2 | * | 11/2013 | Fellows ............ F16B 37/0842 411/177 |
| 8,613,414 B2 | * | 12/2013 | Rosemann ............ F16B 21/073 248/220.21 |
| 8,636,454 B2 | | 1/2014 | Okada et al. |
| 9,033,632 B2 | | 5/2015 | Komsitsky et al. |
| 9,347,474 B2 | * | 5/2016 | Mizukoshi ............ F16B 13/063 |
| 9,366,311 B2 | | 6/2016 | Gustavsson |
| 9,533,718 B2 | * | 1/2017 | Smith .................... F16B 37/043 |
| 9,599,140 B2 | | 3/2017 | Diep et al. |
| 9,649,993 B1 | * | 5/2017 | Dickinson ............. F16B 21/075 |
| 9,841,123 B1 | | 12/2017 | White |
| 10,060,463 B2 | * | 8/2018 | Dendo ................ F16B 19/1081 |
| 10,196,013 B2 | | 2/2019 | Pantino et al. |
| 10,399,516 B2 | * | 9/2019 | Chapman ............ B60R 16/0215 |
| 10,408,248 B1 | * | 9/2019 | Safry .................... F16B 5/0628 |
| 10,737,642 B2 | | 8/2020 | Takahashi et al. |
| 10,900,514 B2 | | 1/2021 | Teece et al. |
| 11,015,742 B2 | | 5/2021 | Locatelli |
| 11,451,025 B2 | | 9/2022 | Teece et al. |
| 2004/0094952 A1 | | 5/2004 | Twardawski et al. |
| 2004/0238203 A1 | | 12/2004 | Arai |
| 2006/0054342 A1 | | 3/2006 | Nakamura et al. |
| 2007/0272807 A1 | | 11/2007 | Takagaki |
| 2008/0134477 A1 | | 6/2008 | Hart et al. |
| 2009/0189025 A1 | | 7/2009 | Lindquist et al. |
| 2010/0026028 A1 | * | 2/2010 | Smith .................... F16B 37/043 296/29 |
| 2010/0127135 A1 | | 5/2010 | Stocker |
| 2010/0183270 A1 | | 7/2010 | Davis et al. |
| 2010/0258686 A1 | | 10/2010 | Sutton et al. |
| 2013/0039718 A1 | | 2/2013 | Fellows |
| 2016/0020000 A1 | | 1/2016 | Doushita et al. |
| 2016/0101756 A1 | * | 4/2016 | Benedetti ............. F16B 21/075 24/464 |
| 2018/0050646 A1 | | 2/2018 | Chapman |
| 2019/0081464 A1 | | 3/2019 | Valenti et al. |
| 2019/0136895 A1 | | 5/2019 | Teece et al. |
| 2019/0304870 A1 | | 10/2019 | Boyd et al. |
| 2020/0032829 A1 | | 1/2020 | Lee |
| 2020/0056726 A1 | | 2/2020 | Loss et al. |
| 2020/0232499 A1 | | 7/2020 | Rasmus et al. |
| 2022/0200252 A1 | | 6/2022 | Teece et al. |
| 2022/0263299 A1 | | 8/2022 | Teece et al. |

FOREIGN PATENT DOCUMENTS

| | | |
|---|---|---|
| EP | 1849687 | 10/2007 |
| GB | 2367955 | 4/2002 |
| WO | 2009111620 | 9/2009 |
| WO | 2014027080 | 2/2014 |
| WO | 2016031774 | 3/2016 |

OTHER PUBLICATIONS

"European Search Report", EP Application No. 18204958.5, dated Mar. 22, 2019, 2 pages.

"Foreign Office Action", EP Application No. 18204958.5, dated Apr. 9, 2020, 6 pages.

"Foreign Office Action", EP Application No. 18204958.5, dated Dec. 3, 2019, 5 pages.

"Non-Final Office Action", U.S. Appl. No. 16/180,732, dated Apr. 1, 2020, 9 pages.

"Notice of Allowance", U.S. Appl. No. 16/180,732, dated Sep. 21, 2020, 7 pages.

"Restriction Requirement", U.S. Appl. No. 16/180,732, dated Jan. 10, 2020, 8 pages.

"Extended European Search Report", EP Application No. 21211285.8, dated May 16, 2022, 10 pages.

"Notice of Allowance", U.S. Appl. No. 17/210,776, dated Mar. 4, 2022, 9 pages.

"Foreign Office Action", EP Application No. 21156638.5, dated Oct. 13, 2022, 7 pages.

\* cited by examiner

US 11,519,444 B2

WIRE-TRAY-ASSEMBLY WITH STUD-MOUNT INSERTS

CROSS-REFERENCE TO RELATED APPLICATIONS

This application is a divisional application of U.S. application Ser. No. 16/180,732, filed Nov. 5, 2018, which claims priority from U.S. Provisional Application Ser. No. 62/582,355, filed Nov. 7, 2017, the disclosures of which are incorporated by reference in their entireties.

TECHNICAL FIELD OF THE INVENTION

This disclosure generally relates to a wire-tray-assembly, and more particularly relates to a wire-tray-assembly with stud-mount inserts.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
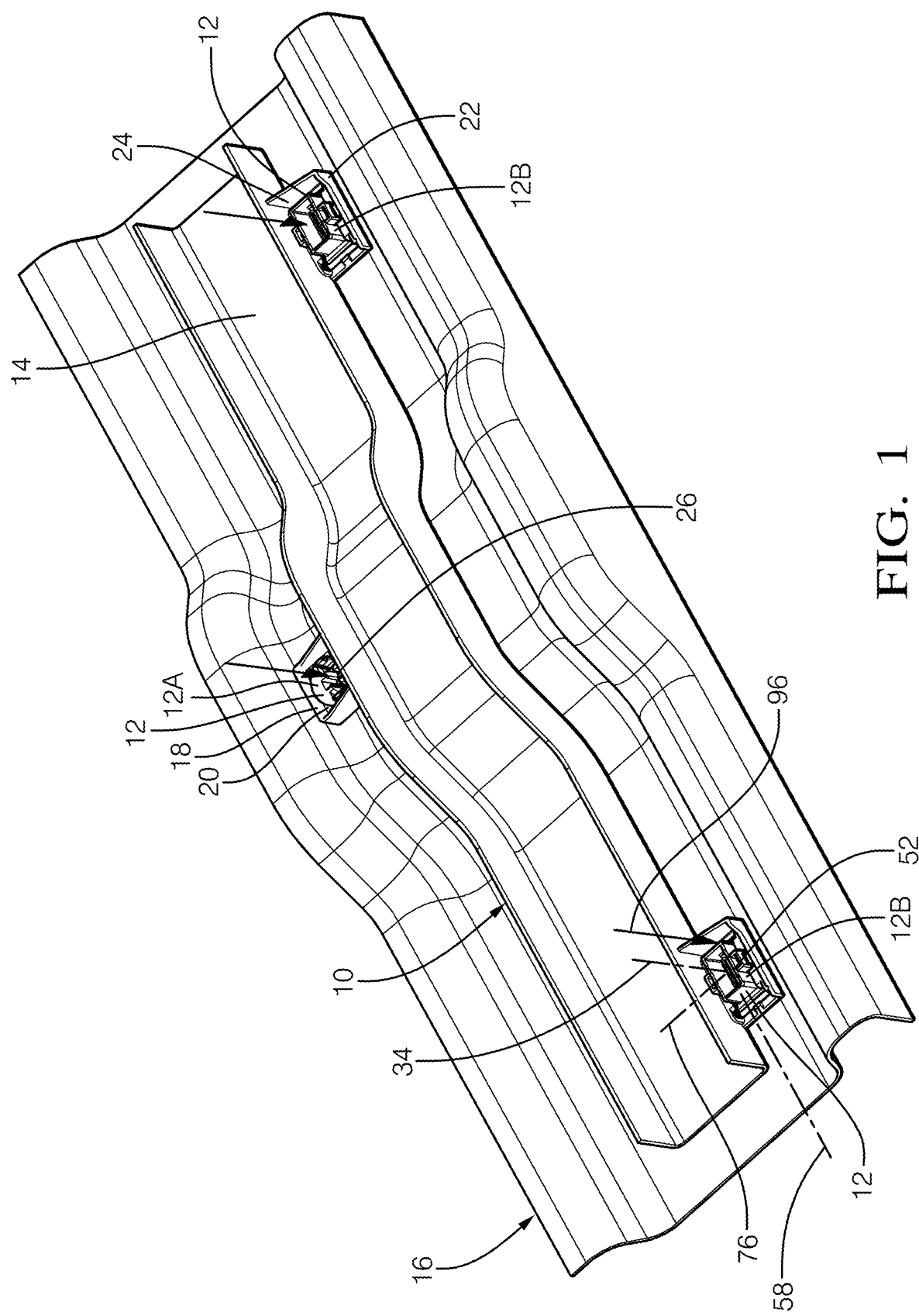
FIG. 1 is a perspective view of a wire-tray assembly in accordance with on embodiment.

FIG. 1 illustrates a wire-tray-assembly 10, hereafter referred to as the assembly 10, configured to route a wiring-harness (not shown) for a vehicle. As will be described in more detail below, the assembly 10 is an improvement over other wire tray assemblies because the assembly 10 includes removable stud-mount inserts 12 that may be formed of a different material than that of a wire-tray 14.

The assembly 10 includes the wire-tray 14 that is preferably formed of a polymeric dielectric material, such as a polypropylene, that may be molded to fit a contour of a substrate 16, such as a panel of an automobile. The assembly 10 also includes a first-mounting-tab 18 defining a first-aperture 20, and a second-mounting-tab 22 defining a second-aperture 24. In the example illustrated in FIG. 1, the first-mounting-tab 18 and the second-mounting-tab 22 are formed integral to the wire-tray 14. It will be appreciated that the assembly 10 may include a plurality of first-mounting-tabs 18 and/or a plurality of second-mounting-tabs 22 depending on a configuration of the substrate 16. In the example illustrated in FIG. 1, the assembly 10 includes one first-mounting-tab 18 and two second-mounting-tabs 22, the benefit of which will be explained below. The first-aperture 20 may be characterized as having a circular shape and connects a top-surface 36 of the wire-tray 14 with a bottom-surface 48 of the wire-tray 14. The second-aperture 24 may be characterized as having a rectilinear shape and also connects the top-surface 36 of the wire-tray 14 with the bottom-surface 48 of the wire-tray 14.

Figure 2A:
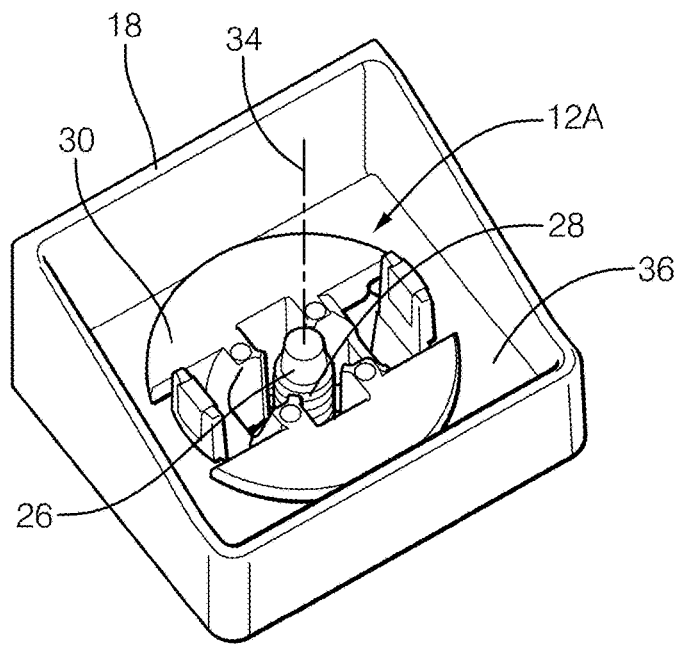
FIG. 2A is a perspective view of a first-mounting-tab of the wire-tray assembly of FIG. 1 in accordance with one embodiment.

FIG. 2A illustrates the first-mounting-tab 18 isolated from the assembly 10. The assembly 10 also includes a first-insert 12A (i.e. a first stud-mount insert 12A) releasably retained by the first-mounting-tab 18 and overlaying the first-aperture 20 such that a first-mounting-stud 26 extends through the first-aperture 20 into the first-insert 12A. The first-insert 12A may be formed of any material and is preferably formed of a polyamide (NYLON) material that has a greater strength and wear resistance that the material of the wire-tray 14.

The first-mounting-stud 26 is fixed to the substrate 16 and is configured to anchor the assembly 10 to the substrate 16. The first-mounting-stud 26 may be formed of any material, such as a steel-alloy, and in the example illustrated in FIG. 1 includes helical threads 28 formed into an outer-surface. The first-insert 12A has a first-flange 30 and a first-body 32 (see FIG. 2B) and is rotatable about a longitudinal-axis 34 of the first-mounting-stud 26. That is, the first-insert 12A may be threaded on and off the first-mounting-stud 26 similar to a nut and bolt combination. The first-flange 30 engages a top-surface 36 of the first-mounting-tab 18 proximate a perimeter 38 of the first-aperture 20. It will be appreciated that the first-flange 30 inhibits the first-insert 12A from passing through the first-aperture 20 and transfers a retention-force from the first-mounting-stud 26 to the first-mounting-tab 18 when the assembly 10 is installed in the vehicle.

Figure 2B:
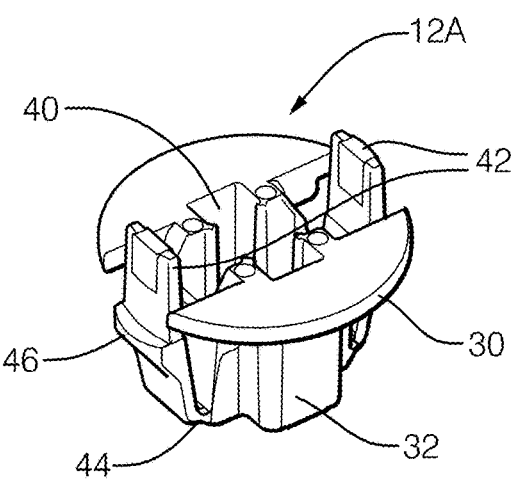
FIG. 2B is a perspective view of a first-insert of the wire-tray assembly of FIG. 1 in accordance with one embodiment.
Figure 2C:
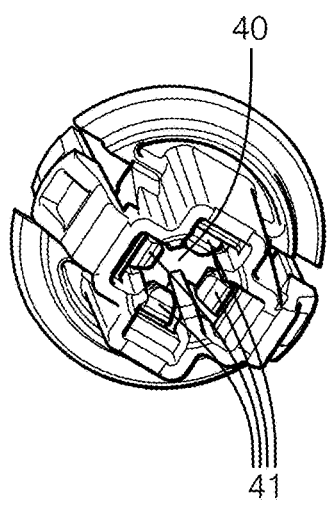
FIG. 2C is another perspective view of the first-insert of the wire-tray assembly of FIG. 1 in accordance with one embodiment.
Figure 2D:
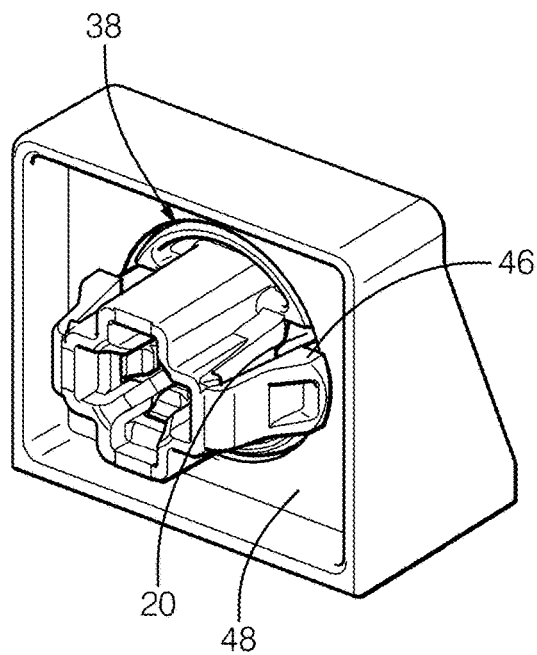
FIG. 2D is another perspective view of a first-mounting-tab of the wire-tray assembly of FIG. 1 in accordance with one embodiment.

FIG. 2B illustrates the first-insert 12A isolated from the assembly 10. The first-body 32 has a generally cylindrical shape extending beyond the first-flange 30 and aligned with the longitudinal-axis 34 of the first-mounting-stud 26. The first-body 32 defines a first-cavity 40 into which are disposed a plurality of first-pawls 41 (see FIG. 2C configured to releasably engage the threads 28 of the first-mounting-stud 26. The first-insert 12A also includes first opposed locking-tabs 42 extending along the longitudinal-axis 34 from an end 44 opposite the first-flange 30 and terminating beyond the first-flange 30. That is, the first opposed locking-tabs 42 extend beyond the top-surface 36 of the first-mounting-tab 18 when the first-insert 12A is retained by the first-mounting-tab 18. The first opposed locking-tabs 42 include locking-ramps 46 configured to releasably engage a bottom-surface 48 of the first-mounting-tab 18 proximate the perimeter 38 of the first-aperture 20, as illustrated in FIG. 2D. The first opposed locking-tabs 42 are configured to inwardly deflect toward the longitudinal-axis 34 enabling an assembler to both install and uninstall the first-insert 12A by depressing the first opposed locking-tabs 42 toward the first-mounting-stud 26. The first-body 32 may include a means to retract and hold the first opposed locking-tabs 42 in a retracted-position (not shown), thereby disengaging the first opposed locking-tabs 42 from the bottom-surface 48 of the first-mounting-tab 18.

Figure 3:
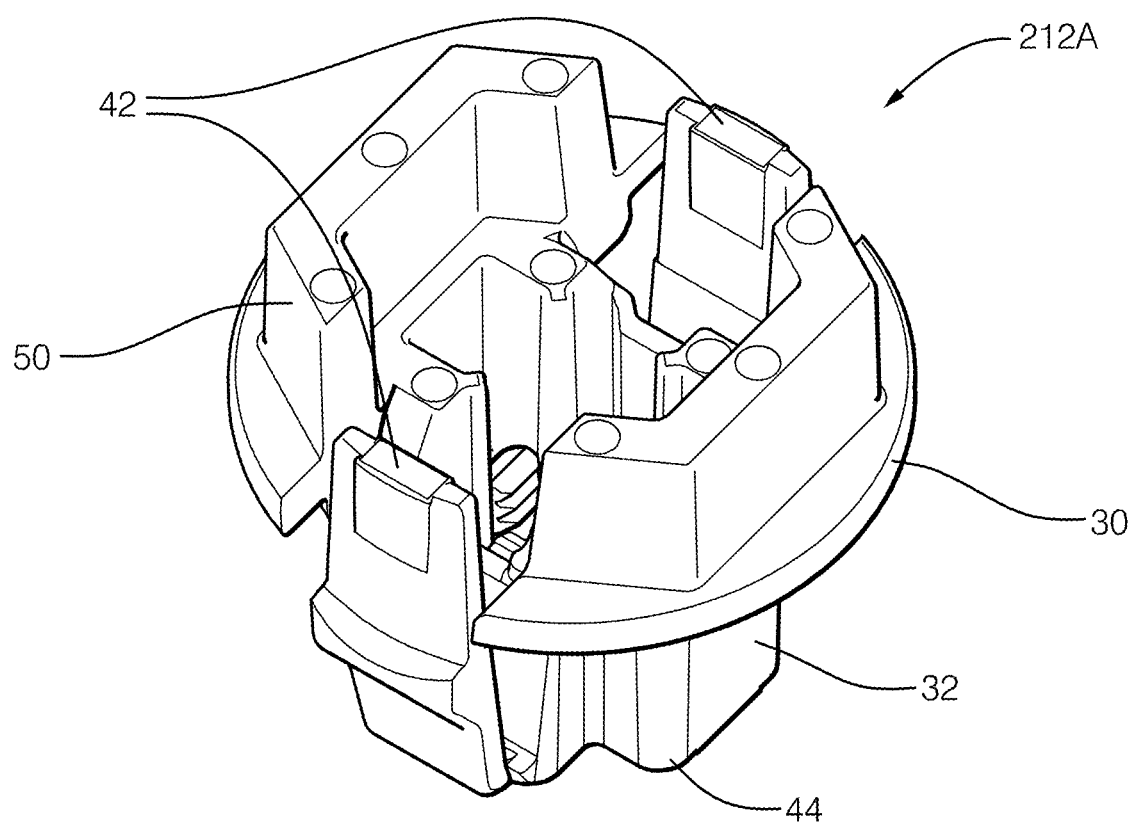
FIG. 3 is a perspective view of another first-insert of the wire-tray assembly of FIG. 1 in accordance with another embodiment.

The first-body 32 is configured to accept a tool to rotate the first-insert 12A about the longitudinal-axis 34 of the first-mounting-stud 26. In the example illustrated in FIG. 2B, a flat-blade screw-driver, or similar tool, may be inserted into the first-cavity 40 to either tighten or loosen the first-insert 12A on the first-mounting-stud 26. In another embodiment of the first-insert 212A illustrated in FIG. 3, the first-body 32 includes a hex-head 50 extending beyond the first-flange 30 in a direction opposite the end 44. The hex-head 50 is configured to receive a hex-socket (not shown) to either tighten or loosen the first-insert 212A on the first-mounting-stud 26. It will be appreciated that the hex-socket releases the first opposed locking-tabs 42 from engaging the bottom-surface 48 enabling a removal of the first-insert 212A from the first-mounting-tab 18.

Figure 4:
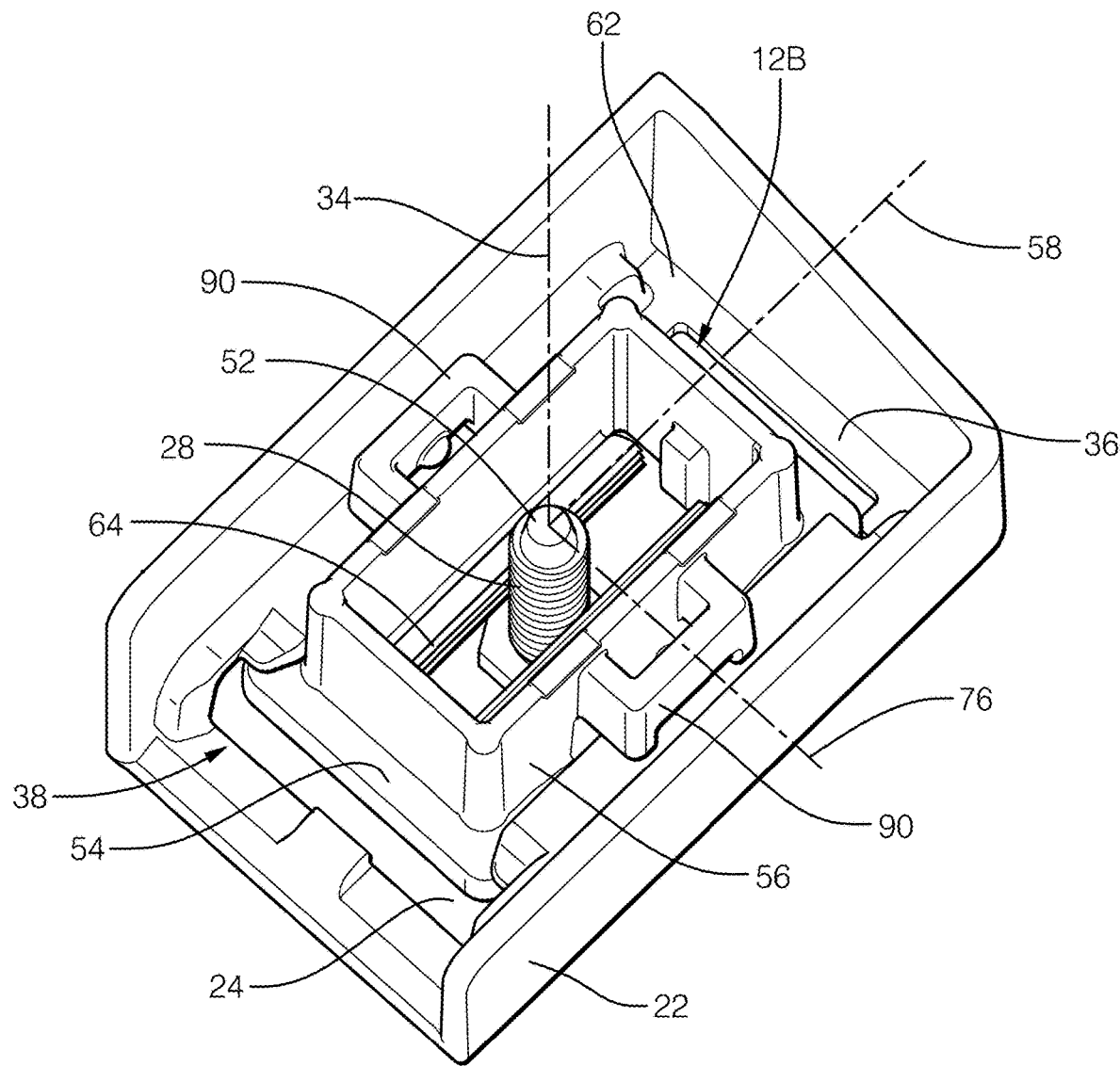
FIG. 4 is a perspective view of a second-mounting-tab of the wire-tray assembly of FIG. 1 in accordance with one embodiment.

FIG. 4 illustrates the second-mounting-tab 22 isolated from the assembly 10. The assembly 10 also includes a second-insert 12B (i.e. a second stud-mount insert 12B) releasably retained by the second-mounting-tab 22 and overlaying the second-aperture 24 such that a second-mounting-stud 52 extends through the second-aperture 24 into the second-insert 12B. The second-insert 12B is preferably formed of the same polymeric material as that of the first-insert 12A. The second-mounting-stud 52 is also fixed to the substrate 16 and is also configured to anchor the assembly 10 to the substrate 16. The second-mounting-stud 52 may be identical to the first-mounting-stud 26, or may have different design features (e.g., diameter, thread-size, length, material, etc.) depending on the application requirements. In the example illustrated in FIG. 4, the second-body 56 may move a total of 14 mm along the lateral-axis 58 relative to the second-mounting-stud 52. This range of movement provides the technical benefit of enabling the mounting the assembly 10 to the mounting-studs having true-positions that exceed the designed positional tolerances.

Figure 5A:
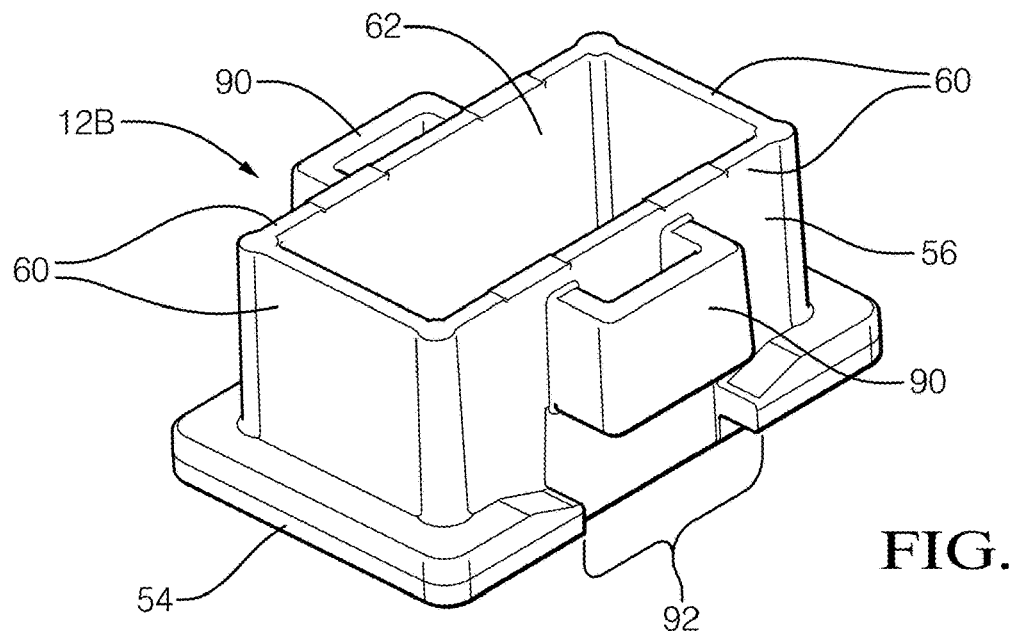
FIG. 5A is a perspective view of a second-insert of the wire-tray assembly of FIG. 1 in accordance with one embodiment.
Figure 5B:
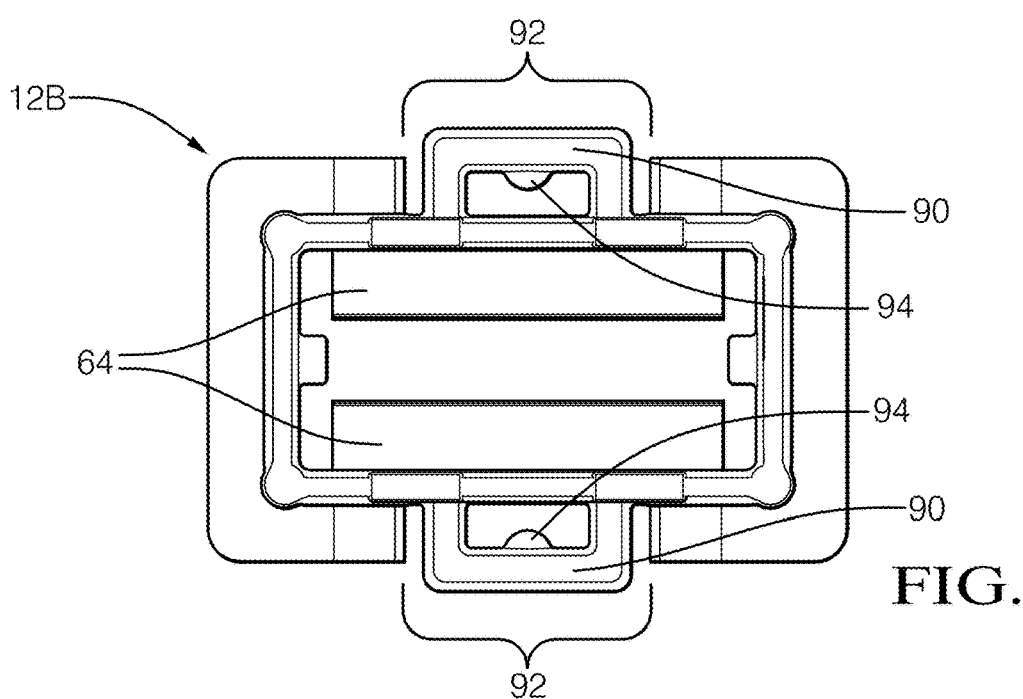
FIG. 5B is a top view of the second-insert of the wire-tray assembly of FIG. 1 in accordance with one embodiment.
Figure 5C:
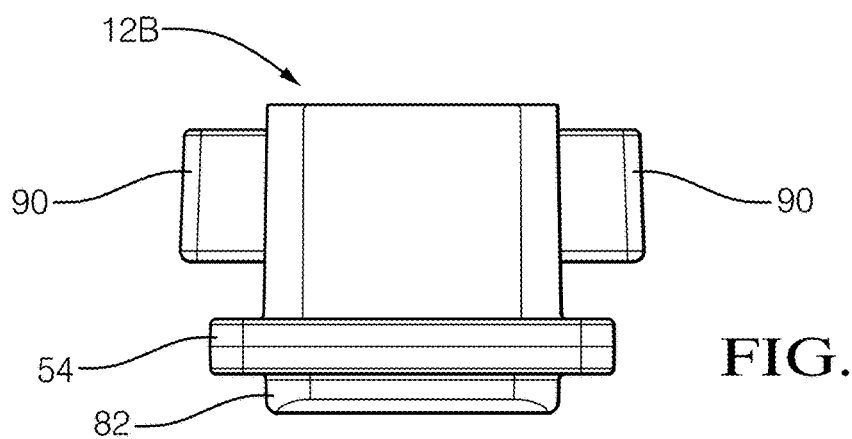
FIG. 5C is an end view of the second-insert of the wire-tray assembly of FIG. 1 in accordance with one embodiment.

FIGS. 5A-5C illustrate the second-insert 12B isolated from the assembly 10. The second-insert 12B has a second-flange 54 and a second-body 56 and is moveable along the lateral-axis 58 of the second-mounting-stud 52 as described above. The second-flange 54 engages the top-surface 36 of the second-mounting-tab 22 proximate the perimeter 38 of the second-aperture 24 (see FIG. 4). It will be appreciated that the second-flange 54 inhibits the second-insert 12B from passing through the second-aperture 24 and transfers the retention-force from the second-mounting-stud 52 to the second-mounting-tab 22 when the assembly 10 is installed in the vehicle.

The second-body 56 has intersecting-walls 60 forming a generally rectilinear shape extending beyond the second-flange 54. The intersecting-walls 60 are aligned with (i.e., parallel with) the longitudinal-axis 34 of the second-mounting-stud 52. The intersecting-walls 60 define a second-cavity 62 into which are disposed a plurality of second-pawls 64 (see FIG. 5B) configured to releasably engage the threads 28 of the second-mounting-stud 52 as illustrated in FIG. 4. The second-body 56 is further configured to accept a tool, such as a blade of a screw driver, to disengage the plurality of second-pawls 64 from the second-mounting-stud 52, thereby enabling the removal of the second-insert 12B from the second-mounting-stud 52.

Figure 6:
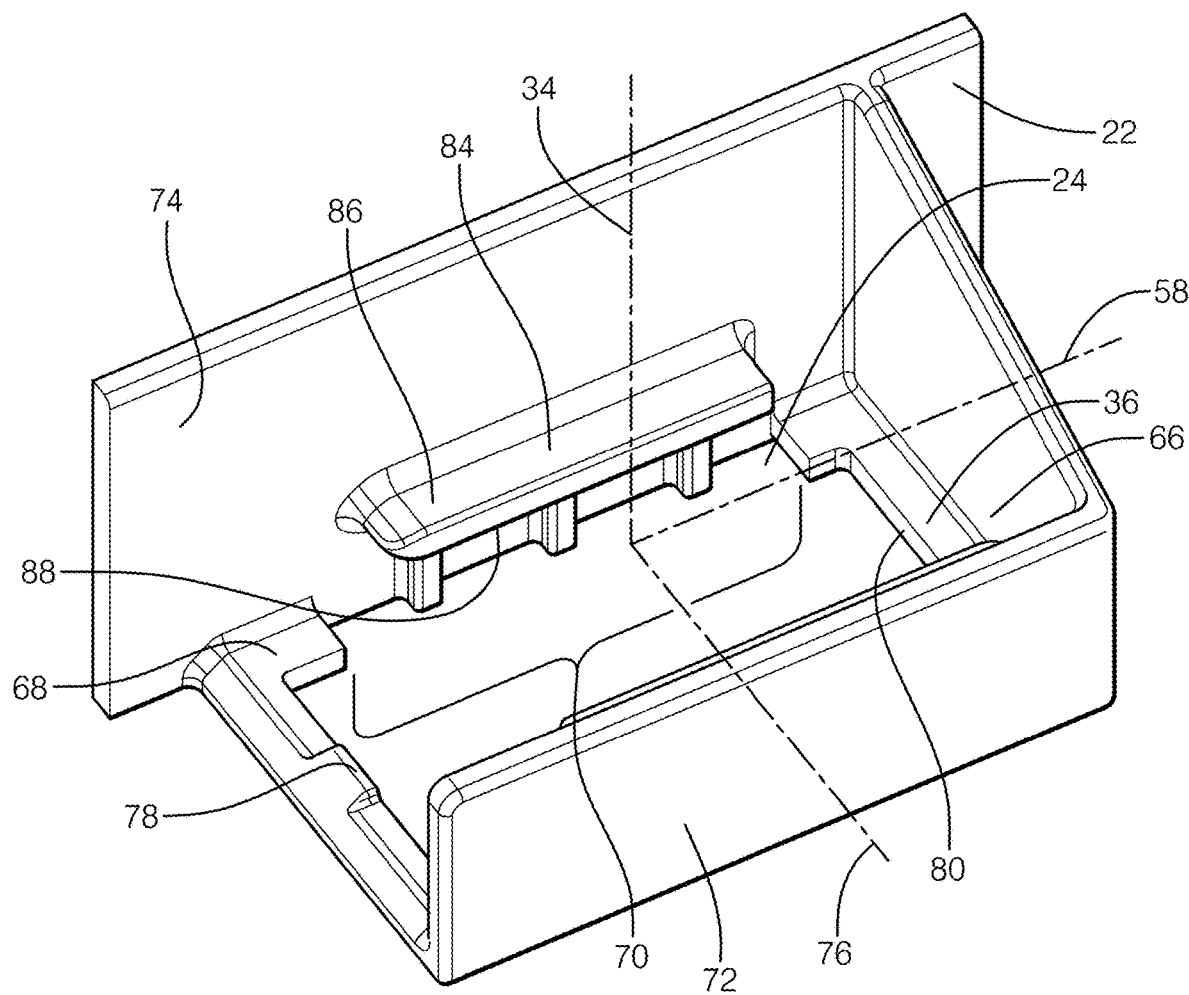
FIG. 6 is another perspective view of the second-mounting-tab of the wire-tray assembly of FIG. 1 in accordance with one embodiment.

FIG. 6 illustrates the second-mounting-tab 22 isolated from the assembly 10, with the second-insert 12B removed. The second-mounting-tab 22 further defines a second-retention-cavity 66 configured to retain the second-insert 12B. The second-retention-cavity 66 has the generally rectilinear shape and the second-aperture 24 is located within a floor 68 of the second-retention-cavity 66. The second-mounting-tab 22 further defines a pair of first-opposed-notches 70 located at a midsection of each of two opposing sides of the second-aperture 24. In the example illustrated in FIG. 6, the pair of first-opposed-notches 70 are located on a first-side 72 and a second-side 74 of the second-mounting-tab 22. The first-side 72 and the second-side 74 are configured to limit the movement of the second-insert 12B along a transverse-axis 76 that is orthogonal to both the longitudinal-axis 34 and the lateral-axis 58. The second-mounting-tab 22 further includes a first-stop 78 and a second-stop 80 configured to limit a movement of the second-insert 12B along the lateral-axis 58 within the second-aperture 24. The second-insert 12B may further include an extension 82 (see FIG. 5C) of the second-body 56 configured to be disposed within the second-aperture 24 and engage both the first-stop 78 and the second-stop 80 when the second-insert 12B moves along the lateral-axis 58. In the example illustrated in FIG. 6, the second-insert 12B may move a total of 9 mm along the lateral-axis 58 within the second-aperture 24. This provides the technical benefit of the assembly 10 having a selfadjusting property during the installation process that does not require the assembler to physically adjust the second-insert 12B along the lateral-axis 58. The first-side 72 and the second-side 74 also include opposing guide-beams 84 that overlay a portion of the second-aperture 24 and are aligned with the lateral-axis 58. The opposing guide-beams 84 define a first-surface 86 and a second-surface 88, the function of which will be explained below.

Referring back to FIGS. 5A-5C, the second-insert 12B includes a pair of opposing brackets 90 extending from a midsection of two opposing walls along the transverse-axis 76. The pair of opposing brackets 90 overlay a portion of the pair of first-opposed-notches 70 of the second-mounting-tab 22 when the second-insert 12B is installed in the second-mounting-tab 22. The pair of opposing brackets 90 are configured to slideably engage the first-surface 86 of the opposing guide-beams 84 and also transfer the retention-force from the second-mounting-stud 52 to the second-mounting-tab 22.

Figure 10A:
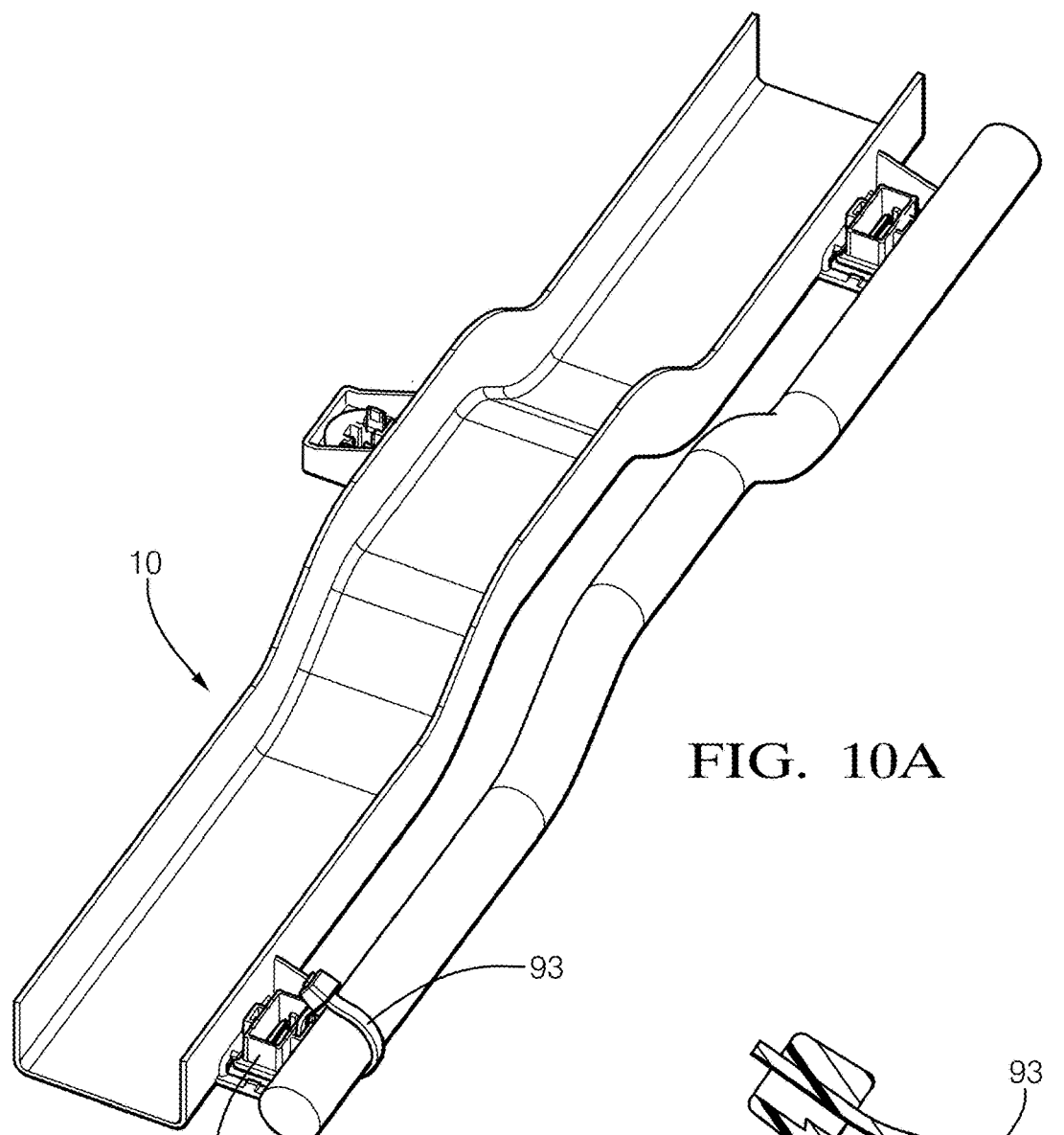
FIG. 10A is another perspective view of the wire-tray-assembly of FIG. 1 in accordance with one embodiment.
Figure 10B:
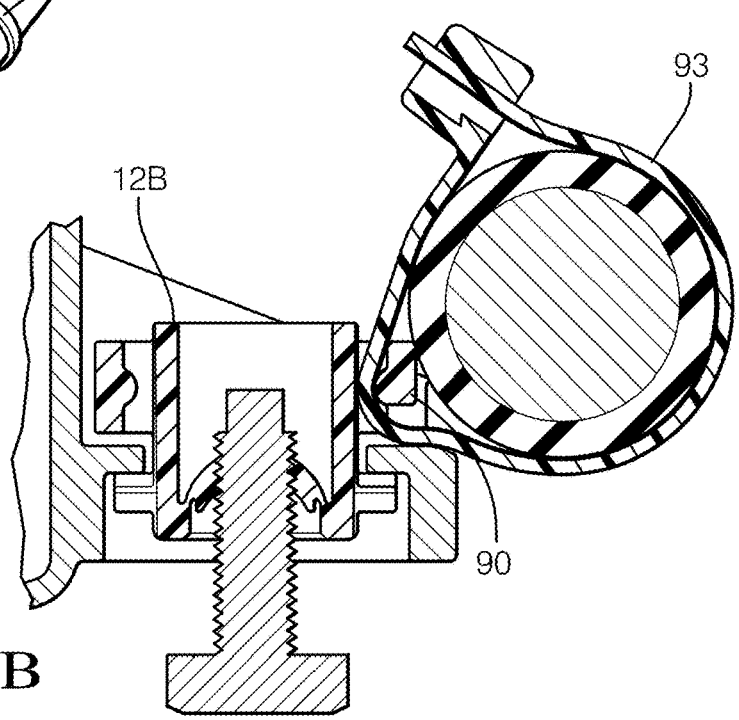
FIG. 10B is a section view of a portion of FIG. 10A in accordance with one embodiment.

The second-flange 54 defines a pair of second-opposed-notches 92 located at a midsection of each of two opposing walls of the second-body 56 that underlay the pair of opposing brackets 90. That is, the second-flange 54 is discontinuous along the lateral-axis 58, defining the pair of second-opposed-notches 92. The pair of second-opposed-notches 92 provide a clearance for a fastener, such as a wire-tie 93 (see FIGS. 10A-10B), to be inserted through the pair of opposing brackets 90 and around the second-body 56 (not shown). The pair of opposing brackets 90 may also include a detent-feature 94 configured to retain the wire-tie 93, as illustrated in FIG. 5B. FIGS. 10A-10B illustrate the wire-tie 93 retained by one of the pair of opposing brackets 90 used to fasten a wire-cable (not specifically shown) to the second-insert 12B.

Figure 7:
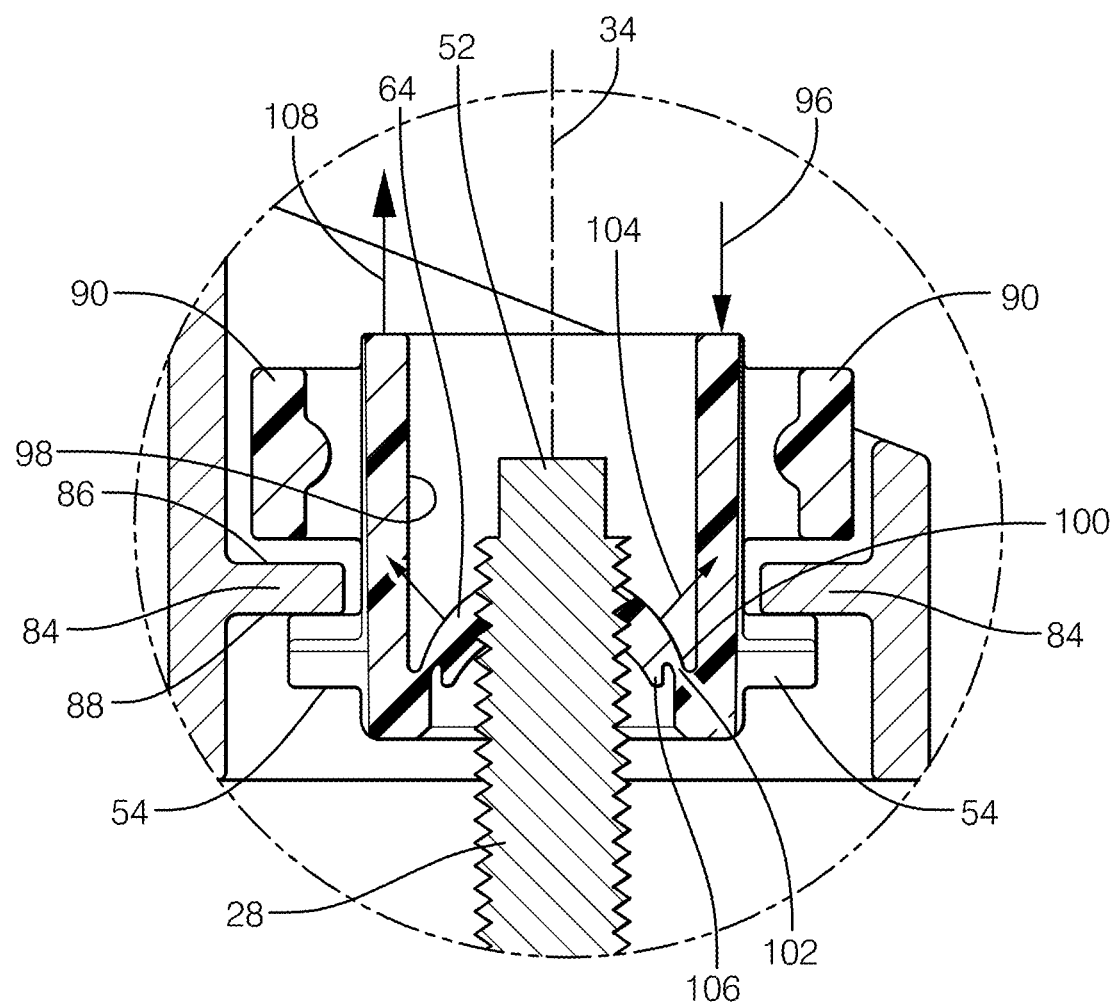
FIG. 7 is a section view of the second-mounting-tab, second-insert, and second-mounting-stud of the wire-tray assembly of FIG. 1 in accordance with one embodiment.

FIG. 7 is a section view of the second-insert 12B retained in the second-mounting-tab 22 and engaging the second-mounting-stud 52. The second-flange 54 slideably engages the second-surface 88 of the opposing guide-beams 84 and also inhibits the second-insert 12B from being separated from the second-mounting-tab 22 when an installation-force 96 is applied to the second-insert 12B.

The following description applies to both the first-insert 12A and the second-insert 12B. FIG. 7 will be used and it will be understood that FIG. 7 will apply to the internal components of both the first-insert 12A and the second-insert 12B. The plurality of first-pawls 41 and the plurality of second-pawls 64 are attached to inner-surfaces 98 of both the first-cavity 40 and the second-cavity 62 by webs 100 that define pivot-points 102. The pivot-points 102 enable the plurality of first-pawls 41 and the plurality of second-pawls 64 to outwardly deflect 104 when engaging the threads 28 of both the first-mounting-stud 26 and the second-mounting-stud 52 during installation. The webs 100 provide a spring-force such that the first-pawls 41 and the second-pawls 64 form a ratchet mechanism with the threads 28 of the first-mounting-stud 26 and the second-mounting-stud 52, thereby enabling the installation over the studs with the installation-force 96.

The plurality of first-pawls 41 and the plurality of second-pawls 64 also include second-stops 106 positioned proximate the webs 100 such that the plurality of first-pawls 41 and the plurality of second-pawls 64 are inhibited from inwardly deflecting when a removal-force 108 is applied along the longitudinal-axis 34 to both the first-insert 12A and the second-insert 12B, thereby resisting the removal-force 108. That is, the plurality of first-pawls 41 engage the threads 28 of the first-mounting-stud 26, and the plurality of second-pawls 64 engage the threads 28 of the second-mounting-stud 52, when the installation-force 96 is applied to both the first-insert 12A and the second-insert 12B along the longitudinal-axis 34 of both the first-mounting-stud 26 and the second-mounting-stud 52.

The plurality of first-pawls 41 and the plurality of second-pawls 64 may include pairs of opposing-pawls, wherein each pair of opposing-pawls is configured to have a different pawl-spacing (see FIG. 7) from other pairs of opposing-pawls. This has the technical benefit of enabling the stud-mount inserts 12 to be attached to mounting-studs with different thread-dimensions. Alternatively, each individual pawl may have a unique pawl-spacing so that a common stud-mount insert 12 may be attached to a variety of mounting-studs with varying thread-dimensions. For example, the opposing-pawls may be configured to be spaced for an M6 threaded mounting-stud, but will still retain the thread 28 of an M5 threaded mounting-stud. An M5 threaded pawl-spacing still allows ergonomic installation over the threaded mounting-stud and will still retain the threads 28 of a M6 threaded mounting-stud. Other thread-sizes are envisioned, but are not illustrated herein.

Figure 8A:
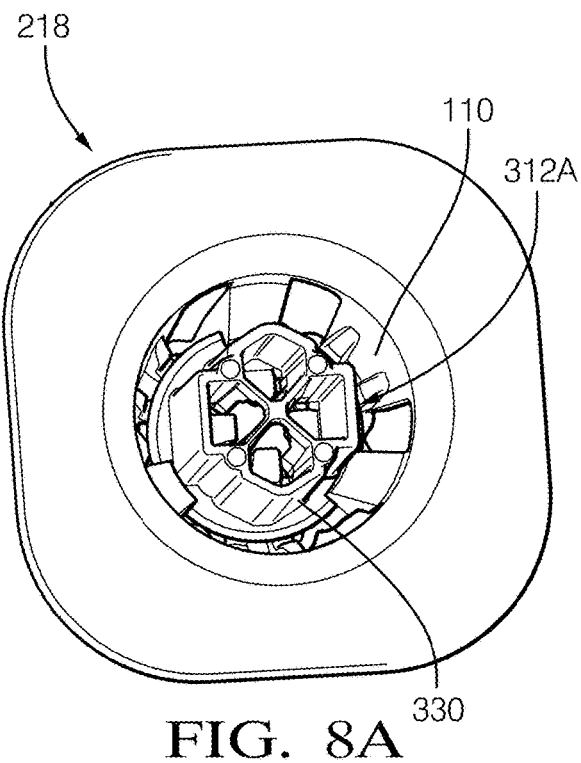
FIG. 8A is perspective view of another embodiment of a first-mounting-tab of the wire-tray assembly of FIG. 1 in accordance with another embodiment.
Figure 8B:
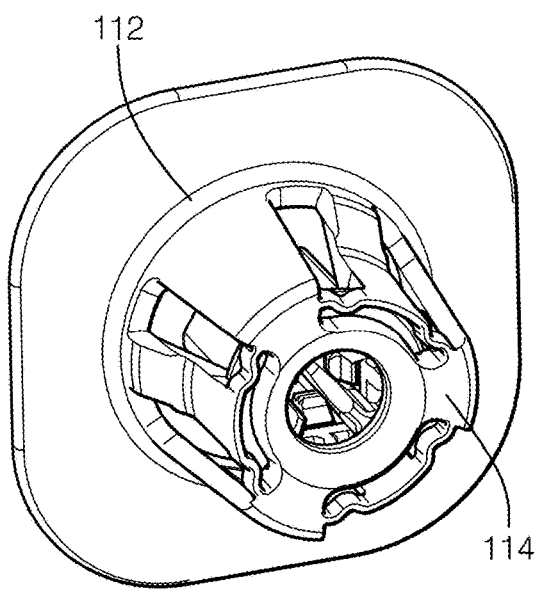
FIG. 8B is another perspective view of the first-mounting-tab of the wire-tray assembly of FIG. 8A in accordance with another embodiment.
Figure 8C:
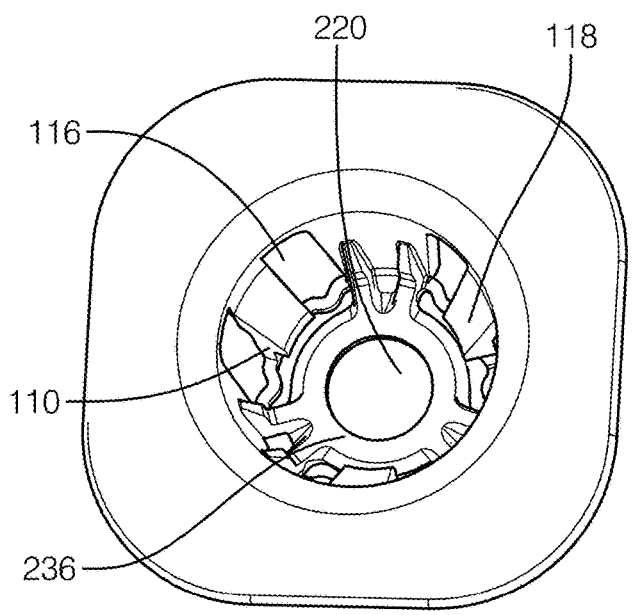
FIG. 8C is yet another perspective view of the first-mounting-tab of the wire-tray assembly of FIG. 8A in accordance with another embodiment.
Figure 8D:
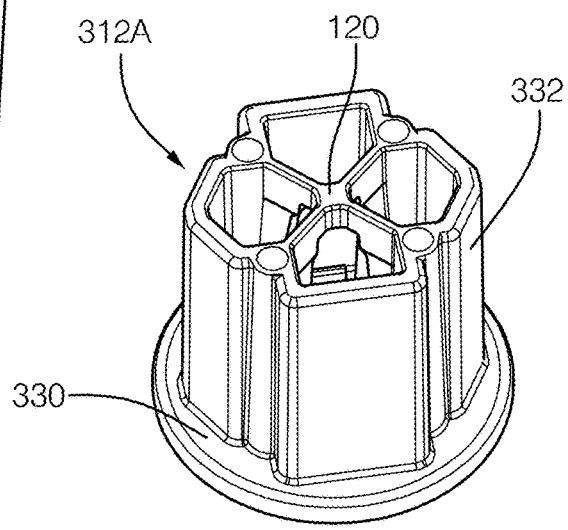
FIG. 8D is a perspective view of another embodiment of a first-insert of the wire-tray assembly of FIG. 1 in accordance with yet another embodiment.
Figure 9A:
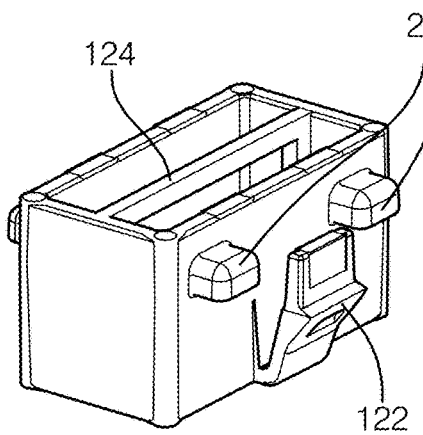
FIG. 9A is a perspective view of another embodiment of a second-insert of the wire-tray assembly of FIG. 1 in accordance with yet another embodiment.
Figure 9B:
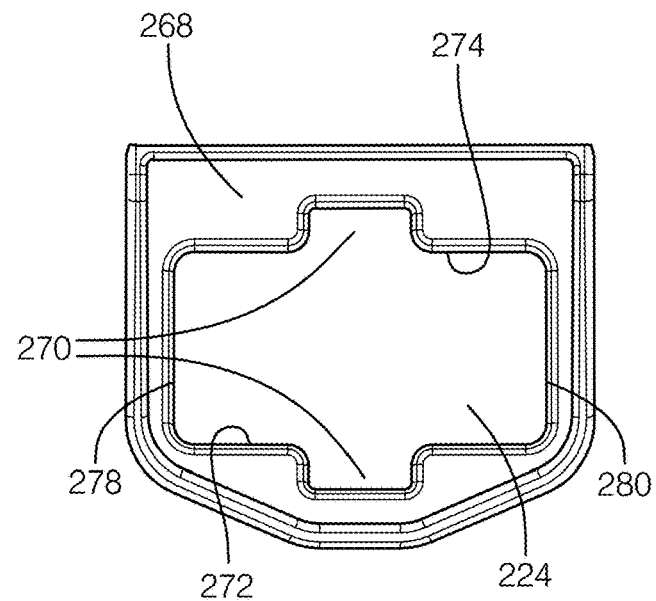
FIG. 9B is a top view of another embodiment of a second-mounting-tab of the wire-tray assembly of FIG. 1 in accordance with yet another embodiment.
Figure 9C:
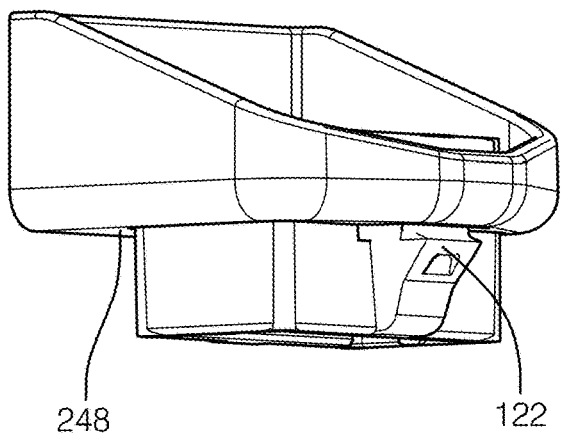
FIG. 9C is a perspective view of the second-mounting-tab and the second-insert of FIGS. 9A and 9B in accordance with yet another embodiment.
Figure 9D:
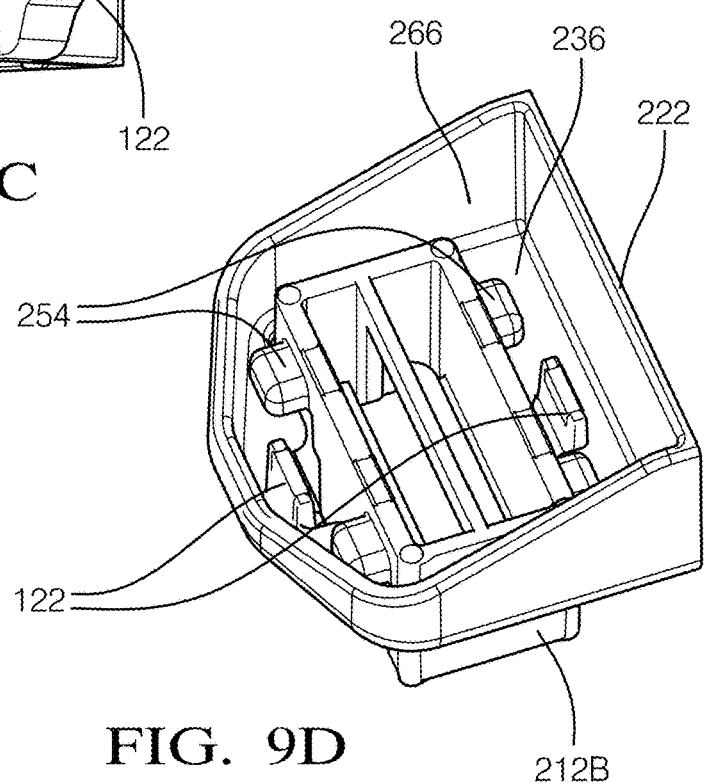
FIG. 9D is another perspective view of another a perspective view of the second-mounting-tab and the second-insert of FIGS. 9A and 9B in accordance with yet another embodiment.

FIGS. 8A-8D illustrate another embodiment of the first-mounting-tab 218. The first-mounting-tab 218 defines a first-retention-cavity 110 configured to retain another embodiment of the first-insert 312A. The first-retention-cavity 110 has a generally truncated conical shape with a base 112 and a cap 114, with a base-diameter greater than a cap-diameter. The first-aperture 220 is positioned coaxial with a center of the cap 114, as illustrated in FIGS. 8B-8C. Interior-walls 116 of the first-retention-cavity 110 include locking-features 118 configured to releasably lock the first-flange 330 within the first-retention-cavity 110. The first-insert 312A is also configured to receive a hex-socket (not shown) to either tighten or loosen the first-insert 312A on the first-mounting-stud 26. It will be appreciated that the hex-socket releases the locking-features 118 from engaging the first-flange 330, thereby enabling a removal of the first-insert 312A from the first-retention-cavity 110. The first-insert 312A may also include a first-blocking-rib 120 formed integral to the first-body 332 and configured to inhibit the first-mounting-stud 26 from extending beyond the first-body 332. It will be appreciated that the first-inserts 12A and 212A may also include the first-blocking-rib 120.

FIGS. 9A-9D illustrate another embodiment of the second-insert 212B and the second-mounting-tab 222. The second-insert 212B includes second opposed locking-tabs 122 extending from a midsection of each of the two opposing walls and are aligned with the longitudinal-axis 34. The second opposed locking-tabs 122 are configured to be disposed within the pair of first-opposed-notches 270 (see FIG. 9B) and engage a bottom-surface 248 of the second-mounting-tab 222 thereby inhibiting a removal of the second-insert 212B from the second-mounting-tab 222. The second-insert 212B may also include a second-blocking-rib 124 formed integral to the second-body 256 and configured to inhibit the second-mounting-stud 52 from extending beyond the second-body 256. It will be appreciated that the second-insert 12B may also include the second-blocking-rib 124.

Accordingly, a wire-tray-assembly 10 (the assembly 10) is provided. The assembly 10 is an improvement over prior art wire tray assemblies because the assembly 10 includes removable stud-mount inserts 12 that may be formed of a different material than that of the wire-tray 14.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Directional terms such as top, bottom, upper, lower, left, right, front, rear, etc. do not denote any particular orientation, but rather these directional terms are used to distinguish one element from another and establish a relationship between the various elements.

What is claimed is:

1. A stud-mount insert configured to be releasably retained by a mounting-tab having an aperture defined therethrough, the stud-mount insert comprising:
    a flange; and
    a body, the body configured to move along a lateral-axis of a mounting-stud,
    wherein the flange is configured to overlay the aperture defined by the mounting-tab such that the mounting-stud extends through the aperture into the body,
    wherein the flange is configured to engage the mounting-tab proximate a perimeter of the aperture,
    wherein the body comprises intersecting-walls forming a generally rectilinear shape extending beyond the flange, the intersecting-walls configured to be aligned with a longitudinal-axis of the mounting-stud, and the intersecting-walls defining a cavity into which are disposed a plurality of pawls configured to releasably engage threads of the mounting-stud,
    wherein the plurality of pawls is attached to inner-surfaces of the cavity by webs that define pivot-points, and
    wherein the plurality of pawls further comprises stops positioned proximate the webs such that the plurality of pawls are inhibited from inwardly deflecting when a removal-force is applied along the longitudinal-axis to the stud-mount insert.

2. The stud-mount insert of claim 1, wherein the body further comprises:
    a blocking-rib configured to inhibit the mounting-stud from extending beyond the body.

3. The stud-mount insert of claim 1, wherein the pivot-points enable the plurality of pawls to outwardly deflect when engaging the threads of the mounting-stud.

4. The stud-mount insert of claim 1, wherein the flange comprises:
    a pair of opposed-notches located at a midsection of each of two opposing walls of the body, and
    wherein the pivot-points enable the plurality of pawls to outwardly deflect when engaging the threads of the mounting-stud.

5. The stud-mount insert of claim 4, wherein the body further comprises:
    opposed locking-tabs, wherein the opposed locking-tabs extend from the midsection of each of the two opposing walls of the body.

6. The stud-mount insert of claim 5, wherein the opposed locking-tabs are aligned with the longitudinal-axis.

7. The stud-mount insert of claim 6, wherein the opposed locking-tabs are configured to engage a bottom-surface of the mounting-tab thereby inhibiting a removal of the stud-mount insert from the mounting-tab.

8. A stud-mount insert configured to be releasably retained by a mounting-tab having an aperture defined therethrough, the stud-mount insert comprising:
    a flange; and
    a body, the body configured to move along a lateral-axis of a mounting-stud,
    wherein the flange is configured to overlay the aperture defined by the mounting-tab such that the mounting-stud extends through the aperture into the body,
    wherein the flange is configured to engage the mounting-tab proximate a perimeter of the aperture,
    wherein the flange defines a pair of opposed-notches located at a midsection of each of two opposing walls of the body,
    wherein the body comprises intersecting-walls forming a generally rectilinear shape extending beyond the flange, the intersecting-walls configured to be aligned with a longitudinal-axis of the mounting-stud, the intersecting-walls defining a cavity into which are disposed a plurality of pawls configured to releasably engage threads of the mounting-stud,
    wherein the plurality of pawls are attached to inner-surfaces of the cavity by webs that define pivot-points, and
    wherein the plurality of pawls further comprise stops positioned proximate the webs such that the plurality of pawls are inhibited from inwardly deflecting when a removal-force is applied along the longitudinal-axis to the stud-mount insert.

9. The stud-mount insert of claim 8, wherein the pivot-points enable the plurality of pawls to outwardly deflect when engaging the threads of the mounting-stud.

* * * * *